(12) United States Patent
Jo et al.

(10) Patent No.: US 11,472,385 B2
(45) Date of Patent: Oct. 18, 2022

(54) BRAKE SYSTEM AND CONTROL METHOD THEREOF

(71) Applicants: Hyundai Motor Company, Seoul (KR); Kia Motors Corporation, Seoul (KR)

(72) Inventors: Young-Jin Jo, Whasung-Si (KR); Jung-Nam Han, Whasung-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 579 days.

(21) Appl. No.: 16/671,417

(22) Filed: Nov. 1, 2019

(65) Prior Publication Data
US 2020/0353929 A1    Nov. 12, 2020

(30) Foreign Application Priority Data

May 10, 2019   (KR) .................. 10-2019-0054717

(51) Int. Cl.
| | | |
|---|---|---|
| *B60T 8/24* | (2006.01) | |
| *B60T 13/68* | (2006.01) | |
| *B60T 17/18* | (2006.01) | |
| *B60T 8/34* | (2006.01) | |
| *B60T 8/42* | (2006.01) | |

(52) U.S. Cl.
CPC ............ *B60T 8/245* (2013.01); *B60T 13/686* (2013.01); *B60T 17/18* (2013.01); *B60T 8/348* (2013.01); *B60T 8/4275* (2013.01); *B60T 2201/04* (2013.01); *B60T 2270/403* (2013.01)

(58) Field of Classification Search
CPC ........ B60T 8/245; B60T 8/348; B60T 8/4275; B60T 13/686; B60T 17/18; B60T 2201/04; B60T 2270/403
See application file for complete search history.

(56) References Cited

U.S. PATENT DOCUMENTS

| | | | |
|---|---|---|---|
| 4,852,950 A | 8/1989 | Murakami | |
| 6,183,050 B1 | 2/2001 | Ganzel | |
| 6,206,484 B1 * | 3/2001 | Ganzel | ..................... H03K 5/08 303/119.2 |
| 7,052,094 B2 * | 5/2006 | Ganzel | .................. B60T 8/4836 303/114.1 |
| 7,762,633 B2 * | 7/2010 | Maskell | .................. B60T 8/245 303/192 |
| 10,293,798 B2 * | 5/2019 | Johnson | ................ B60T 13/686 |

(Continued)

FOREIGN PATENT DOCUMENTS

| | | |
|---|---|---|
| EP | 2 500 221 A1 | 9/2012 |
| KR | 10-0512439 B1 | 8/2005 |

OTHER PUBLICATIONS

Extended European Search Report dated Mar. 12, 2020, for European Patent Application No. 19210879.3.

*Primary Examiner* — Thomas W Irvin
(74) *Attorney, Agent, or Firm* — Morgan, Lewis & Bockius LLP (SF)

(57) ABSTRACT

A brake system may include a first hydraulic line; a second hydraulic line; a third hydraulic line; a fourth hydraulic line; a third switch valve; a fourth switch valve; a fifth hydraulic line; a sixth hydraulic line. The brake control unit can suppress a Vapor Lock even in a frequency brake operation in the section in which the downhill traveling from the highland to the flat is continued.

20 Claims, 5 Drawing Sheets

(56) References Cited

U.S. PATENT DOCUMENTS

| | | | |
|---|---|---|---|
| 10,501,063 B2* | 12/2019 | Krueger | B60T 8/00 |
| 11,383,688 B2* | 7/2022 | Dolmaya | B60T 8/4081 |
| 2004/0004394 A1* | 1/2004 | Ganzel | B60T 13/686 |
| | | | 303/114.1 |
| 2006/0208566 A1* | 9/2006 | Ohtsu | B60T 8/245 |
| | | | 303/191 |
| 2018/0037203 A1* | 2/2018 | Maruo | B60T 8/17 |
| 2020/0189546 A1* | 6/2020 | Dolmaya | B60T 13/686 |
| 2022/0009460 A1* | 1/2022 | Nishiura | B60T 13/686 |

* cited by examiner

BRAKE SYSTEM AND CONTROL METHOD THEREOF

CROSS-REFERENCE TO RELATED APPLICATION

The present application claims priority to Korean Patent Application No. 10-2019-0054717, filed on May 10, 2019, the entire contents of which is incorporated herein for all purposes by this reference.

BACKGROUND OF THE DISCLOSURE

Field of the Disclosure

The present invention relates to a brake system and a control method thereof, and more particularly, to a brake system and a control method thereof, which can suppress a Vapor Lock even at a frequent brake operation in a section where downward traveling from a highland to a flat continues.

Description of Related Art

It is more important for a vehicle to stop better than to travel well. Therefore, the brake of the vehicle is very important. There are ones applying a disc and a caliper of a large diameter as a type of the brake to increase a braking force.

For example, it is a four-piston brake or a six-piston brake, etc. When a braking force increases, a braking distance is shortened, which is advantageous for safety. That is, a braking force of the two-piston brake system may be superior to that of the one-piston brake system. Herein, the piston provides a force to cause friction a brake pad mounted on a brake caliper to a wheel disc at hydraulic pressure.

For a more powerful braking force, it may be more advantageous to increase the number of pistons. However, as described above, most of a disc of a large diameter and a brake with a caliper corresponding thereto are very expensive.

Furthermore, since the weight also increases as the size increases, it has no preferable limitation in terms of the sprung mass. To overcome these limitations, today's vehicles apply an ABS brake technology together as a technology of reducing the braking distance. The ABS brake is a technique of repeatedly operating the brake during a very short time.

However, the brake system of a vehicle is vulnerable to heat because the operating fluid called brake oil is used as a driving source.

That is, when the brake is operated, the brake pad provided at the caliper is rubbed against the brake disc fixed to the vehicle wheel to generate heat of high temperature. The heat of high temperature is also transferred to the brake oil. It begins to boil when the brake oil reaches a predetermined threshold temperature.

At the present time, Vapor may be formed in the brake oil, which reduces a pedal effort of the brake to remarkably deteriorate a braking force. This phenomenon is called a Vapor Lock, which is a very critical factor in the safe operation as a factor that hinders the normal operation of the brake.

The Vapor Lock is easy to occur when a brake operation is frequent in the case that the vehicle travels on the long downhill road with a steep slope for a long time. That is, there is a greater likelihood of causing the problem of the Vapor Lock when the vehicle travels on the long downhill road with a steep slope for a long time.

Meanwhile, a hydraulic line in which the brake oil is guided to each wheel is conventionally fixed. That is, the hydraulic line provided to the front wheel brake and the rear wheel brake was always connected. That is, the brake oil was always provided in common to the front wheel brake and the rear wheel brake.

Such a conventional brake system is a structure in which the Vapor generated in the brake oil may be simultaneously provided to both a front wheel caliper and a rear wheel caliper. That is, there has been a problem in that the brake oil in which bubbles are generated is sent from a master cylinder to each caliper disposed at each wheel by a pump.

Therefore, when the front wheel brake is heated to a high temperature and the Vapor Lock phenomenon occurs, the rear wheel brake is also influenced by the Vapor Lock, deteriorating the performance of the entire brake system.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a brake system and a control method thereof, which can safely operate a brake even when the Vapor Lock of brake oil occurs without increasing the size of a brake.

The present invention may include a brake system having a first hydraulic supply line and a second hydraulic supply line in which an operating fluid is individually provided from a master cylinder of a vehicle, which may include a first hydraulic line having a first valve and branched from the first hydraulic supply line to connect between a first caliper of a first wheel brake; a second hydraulic line having a second valve and branched from the first hydraulic supply line to connect between a second caliper of a second wheel brake disposed on the diagonal line of the first wheel brake; a third hydraulic line having a third valve and branched from the second hydraulic supply line to connect between a third caliper of a third wheel brake in a position opposite to the second wheel brake; a fourth hydraulic line having a fourth valve and branched from the second hydraulic supply line to connect between a fourth caliper of a fourth wheel brake disposed on the diagonal line of the third wheel brake; a third switch valve disposed on any one of the first hydraulic supply line and the second hydraulic supply line; and a fourth switch valve which is any one of the second valve or the third valve.

Furthermore, the present invention may include the brake system including a fifth hydraulic line having a first switch valve and configured for connecting the first hydraulic line with the fourth hydraulic line; a sixth hydraulic line having a second switch valve and configured for connecting the second hydraulic line with the third hydraulic line; and a brake control unit configured of determining whether the vehicle satisfies a first condition which is in a normal traveling state, or whether the vehicle satisfies a second condition which is in an alpine traveling state.

Furthermore, the brake control unit is configured to control the first switch valve, the second switch valve, the third switch valve, and the fourth switch valve so that a pair of the first switch valve and the second switch valve and a pair of the third switch valve and the fourth switch valve operate the opening or the closing in the same manner as each other, and a pair of the first switch valve and the third switch valve and a pair of the second switch valve and the fourth switch valve operate the opening or the closing in the opposite manner to each other according to whether to satisfy the first condition which is in the normal traveling state and to satisfy the second condition which is in the alpine traveling state.

Furthermore, when the vehicle satisfies the second condition, the brake control unit is configured to control to open the first switch valve and the second switch valve, and close the third switch valve and the fourth switch valve so that the first operating fluid is provided to the first hydraulic line and the fourth hydraulic line, and the second operating fluid is separately provided to the second hydraulic line and the third hydraulic line, respectively.

Furthermore, when the vehicle satisfies the first condition, the brake control unit is configured to control to close the first switch valve and the second switch valve, and open the third switch valve and the fourth switch valve so that the first operating fluid is provided to the first hydraulic line and the second hydraulic line, and the second operating fluid is separately provided to the third hydraulic line and the fourth hydraulic line, respectively.

Furthermore, the third switch valve is disposed on at least any one of between one end portion of the fifth hydraulic line and a branch point of the second hydraulic line on the first hydraulic supply line or between the other end portion of the fifth hydraulic line and a branch point of the third hydraulic line on the second hydraulic supply line.

Furthermore, the first wheel brake is a right front wheel brake of the vehicle, the second wheel brake is a left rear wheel brake of the vehicle, the third wheel brake is a right rear wheel brake of the vehicle, and the fourth wheel brake is a left front wheel brake of the vehicle.

Furthermore, the second condition is determined by at least any one of the traveling road slope, the braking pressure, and the braking frequency information.

Furthermore, the traveling road slope is equal to or greater than −4 degrees.

Furthermore, the braking pressure is equal to or greater than 0.3 g.

Furthermore, the braking frequency is two times or more per minute for at least 5 minutes.

Furthermore, the first condition is determined by at least any one of the traveling road slope of the vehicle and the traveling time information of the vehicle traveling on the traveling road slope thereof.

Furthermore, the traveling road slope is a slope continuing in a state smaller than −4 degrees for at least 5 minutes.

Furthermore, the brake system may include a first pipe having one end portion branched between a branch point of the second hydraulic line and the master cylinder and having the other end portion connected to a first accumulator mounted on the first hydraulic supply line; a first pump disposed in the first pipe; a second pipe having one end portion branched between a branch point of the third hydraulic line and the master cylinder and having the other end portion connected to a second accumulator mounted on the second hydraulic supply line; and a second pump disposed in the second pipe.

Furthermore, the brake system may include a third pipe extending from the first accumulator; a fifth valve branched from the third pipe to be connected to the first valve; a sixth valve branched from the third pipe to be connected to the second valve; a fourth pipe extending from the second accumulator; a seventh valve branched from the fourth pipe to be connected to the third valve; and an eighth valve branched from the fourth pipe to be connected to the fourth valve.

Furthermore, the first hydraulic line is branched between the first valve and the fifth valve.

Furthermore, the second hydraulic line is branched between the second valve and the sixth valve.

Furthermore, the third hydraulic line is branched between the third valve and the seventh valve.

Furthermore, the fourth hydraulic line is branched between the fourth valve and the eighth valve.

Furthermore, the sixth hydraulic line has one end portion connected between the second valve and the sixth valve, and has the other end portion connected between the third valve and the seventh valve.

Meanwhile, the present invention may include a method for controlling a brake including determining traveling that supplies a first operating fluid to a first wheel brake and a second wheel brake while supplying a second operating fluid to a third wheel brake and a fourth wheel brake by setting a brake system to an X pipe mode, when the traveling of a vehicle is determined by a brake control unit; determining a slope that is configured to determine whether the traveling road slope of the vehicle is the ramp satisfying a predetermined slope value; determining braking pressure that is configured to determine whether the braking pressure of the vehicle satisfies a predetermined braking pressure value; determining braking frequency that is configured to determine whether the braking frequency of the vehicle is equal to a predetermined braking frequency value; and changing a hydraulic supply line that supplies the first operating fluid to the first wheel brake and the fourth wheel brake while supplying the second operating fluid to the second wheel brake and the third wheel brake by setting the brake system to an H pipe mode, when the predetermined slope value, the predetermined braking pressure value, and the predetermined braking frequency value are all satisfied.

Furthermore, the change from the X pipe mode to the H pipe mode is a state in which the slope value is equal to or greater than −4 degrees, the braking pressure value is equal to or greater than 0.3 g, and the braking frequency value continues at two times or more per minute for at least 5 minutes.

Furthermore, the determining the traveling determines whether a transmission has been placed to a drive position.

Furthermore, the determining the slope determines whether the gradient of the traveling road is equal to or greater than −4 degrees.

Furthermore, the determining the braking pressure determines whether the braking pressure is equal to or greater than 0.3 g.

Furthermore, the determining the braking frequency determines whether the braking frequency continues at two times or more per minute for at least 5 minutes.

Furthermore, the method for controlling the brake may further include determining a second slope that is configured to determine whether the traveling road slope is equal to a predetermined second gradient; and determining a second gradient duration time that is configured to determine whether the second gradient continues for at least 5 minutes, and when the second gradient and the second gradient duration time are all satisfied, the first switch valve and the second switch valve are closed, and the third switch valve and the fourth switch valve are opened so that the first operating fluid is provided back to the first hydraulic line and the second hydraulic line, the second hydraulic fluid is separately provided back to the third hydraulic line and the fourth hydraulic line, respectively.

Furthermore, the second gradient is smaller than −4 degrees.

Furthermore, the second gradient duration time is equal to or more 5 minutes.

According to an exemplary embodiment of the present invention as described above, the following effects may be obtained.

Firstly, it is possible not to affect the rear wheel brake even when the Vapor Lock of the brake oil due to the increase in the temperature of the front wheel brake occurs, safely operating the brake.

Secondly, it is possible to maximize a braking force even without increasing the size of the brake, saving the manufacturing cost.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
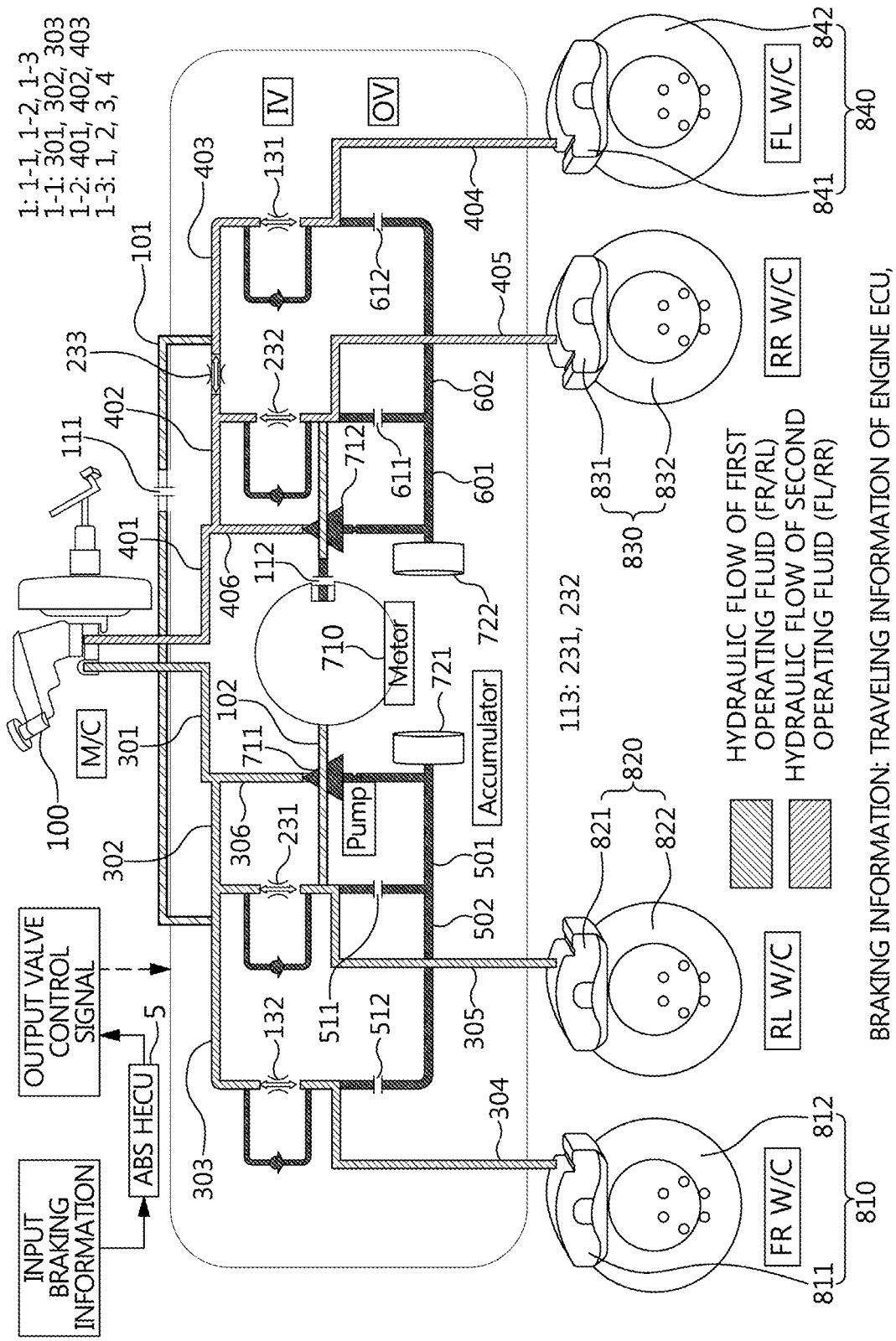
FIG. 1 is a diagram showing a brake hydraulic line in the normal condition according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Like reference numerals are used for like elements in describing each drawing.

The terms "first," "second," and the like may be used to illustrate various components, but the components may not be limited by the terms. The terms are used to differentiate one element from another.

For example, a first component may be referred to as a second component, and similarly, the second component may be also referred to as the first component without departing from the scope of the present invention. The terms "and/or" includes a plurality of related listed items or any of a plurality of related listed items.

Unless otherwise defined, all terms including technical and scientific terms used herein have the same meaning as commonly understood by one of normal skill in the art to which an exemplary embodiment of the present invention belongs.

It will be further understood that terms, such as those defined in commonly used dictionaries, may be additionally interpreted as having a meaning which is consistent with their meaning in the context of the relevant art, and will not be interpreted in an idealized or overly formal sense unless expressly so defined in the application.

An ABS brake system of an exemplary embodiment of the present invention can include a plurality of ABS brake hydraulic lines having a valve so that the operating fluid separately receiving a transferring force from a master cylinder 100 of a vehicle may be selectively communicated fluidly.

The master cylinder 100 of the vehicle is connected to a brake hydraulic circuit 1, and the brake hydraulic circuit 1 provides the operating fluid individually through a hydraulic line 1-3 together with a first hydraulic supply line 1-1 and a second hydraulic supply line 1-2.

The first hydraulic supply line 1-1 includes a first operating fluid supply pipe 301, a ninth pipe 302, and a tenth pipe 303. The second hydraulic supply line 1-2 includes a second operating fluid supply pipe 401, an eleventh pipe 402, and a twelfth pipe 403. The operating fluid can indicate brake oil.

Firstly, the hydraulic line provided with the brake hydraulic pressure according to an exemplary embodiment of the present invention will be described with reference to the accompanying drawings.

The hydraulic line 1-3 according to an exemplary embodiment of the present invention includes a first hydraulic line 1, a second hydraulic line 2, a third hydraulic line 3, a fourth hydraulic line 4, a fifth hydraulic line 101, and a sixth hydraulic line 102. In the instant case, the first hydraulic line 1 and the second hydraulic line 2 include the first hydraulic supply line 1-1, and the third hydraulic line 3 and the fourth hydraulic line 4 include the second hydraulic supply line 1-2.

A valve used in the plurality of brake hydraulic lines of the present invention includes a first valve 132, a second valve 231, a third valve 232, a fourth valve 131, a fifth valve 512, a sixth valve 511, and a third switch valve 233. Furthermore, the valve can further include a first switch valve 111, a second switch valve 112, and a fourth switch valve 113 as a switch valve.

Meanwhile, the first valve 132, the second valve 231, the third valve 232, and the fourth valve 131 may be a one-way throttle valve provided with a one-way valve for preventing the backflow, respectively.

As such, the layout relationship between the hydraulic lines and the valves is as follows. The first hydraulic line is branched between the first valve 132 and the fifth valve 512. The second hydraulic line is branched between the second valve 231 and the sixth valve 511. The third hydraulic line is branched between the third valve 232 and a seventh valve 611. The fourth hydraulic line is branched between the fourth valve 131 and an eighth valve 612. The fifth hydraulic line 101 connects the first hydraulic supply line with the second hydraulic supply line. The sixth hydraulic line 102 has one end portion connected between the second valve 231 and the sixth valve 511, and has the other end portion connected between the third valve 232 and the seventh valve 611.

Meanwhile, the master cylinder 100 can apply an individual operating fluid to the first operating fluid supply pipe 301 and the second operating fluid supply pipe 401, respectively.

The first operating fluid may be applied to the first operating fluid supply pipe 301, and the second operating fluid may be individually provided to the second operating fluid supply pipe 401. The first hydraulic line 1 has the first valve 132 and is branched from the first hydraulic supply line 1-1 to connect between a first caliper 811 of a first wheel brake 810.

The first hydraulic line 1 connects between the master cylinder 100 and the first caliper 811, which is the right front wheel caliper of the vehicle, to control the first wheel brake 810. At the instant time, the first wheel brake 810 indicates the brake system of the right front wheel of the vehicle.

The first hydraulic line 1 includes the first operating fluid supply pipe 301, the ninth pipe 302, the tenth pipe 303, and the fifth pipe 304. Therefore, the first hydraulic line 1 includes the component of the first hydraulic supply line 1-1 or mean the fifth pipe 304 connected to the tenth pipe 303.

Furthermore, the end portion of the first operating fluid supply pipe 301 is connected to the master cylinder 100, and the end portion of the fifth pipe 304 is connected to the first caliper 811. The first valve 132 is disposed in the first hydraulic line 1, and the first valve 132 is disposed between the tenth pipe 303 and the fifth pipe 304. The second hydraulic line 2 has the second valve 231 and is branched from the first hydraulic supply line 1-1 to connect between a second caliper 821 of a second wheel brake 820 disposed on the diagonal line of the first wheel brake 810 therewith.

The second hydraulic line 2 connects between the master cylinder 100 and the second caliper 821, which is the left rear wheel caliper of the vehicle, to control the second wheel brake 820. At the instant time, the second wheel brake 820 indicates the brake system of the left rear wheel of the vehicle.

The second hydraulic line 2 includes the first operating fluid supply pipe 301, the ninth pipe 302, and the sixth pipe 305. Therefore, the second hydraulic line 2 includes the component of the first hydraulic supply line 1-1 or mean the sixth pipe 305 connected to the ninth pipe 302.

Furthermore, the end portion of the first operating fluid supply pipe 301 is connected to the master cylinder 100, and the end portion of the sixth pipe 305 is connected to the second caliper 821. The second valve 231 is disposed in the second hydraulic line 2, and more specifically, the second valve 231 is disposed between the ninth pipe 302 and the sixth pipe 305. The third hydraulic line 3 has the third valve 232 and is branched from the second hydraulic supply line 1-2 to connect between a third caliper 831 of a third wheel brake 830 in a position opposite to the second wheel brake 820.

The third hydraulic line 3 connects between the master cylinder 100 and the third caliper 831, which is the right rear wheel caliper of the vehicle, to control the third wheel brake 830. At the instant time, the third wheel brake 830 indicates the brake system of the right rear wheel of the vehicle.

The third hydraulic line 3 includes the second operating fluid supply pipe 401, the eleventh pipe 402, and the eighth pipe 405. Therefore, the third hydraulic line 3 includes the component of the second hydraulic supply line 1-2 or mean the eighth pipe 405 connected to the eleventh pipe 402.

Furthermore, the end portion of the second operating fluid supply pipe 401 is connected to the master cylinder 100, and the end portion of the eighth pipe 405 is connected to the third caliper 831. The third valve 232 is disposed in the third hydraulic line 3, and more specifically, the third valve 232 is disposed between the eleventh pipe 402 and the eighth pipe 405. The fourth hydraulic line 4 has the fourth valve 131 and is branched from the second hydraulic supply line 1-2 to connect between a fourth caliper 841 of a fourth wheel brake 840 disposed on the diagonal line of the third wheel brake.

The fourth hydraulic line 4 connects between the master cylinder 100 and the fourth caliper 841, which is the left front wheel caliper of the vehicle, to control the fourth wheel brake 840. At the instant time, the fourth wheel brake 840 indicates the brake system of the left front wheel of the vehicle.

The fourth hydraulic line 4 includes the second operating fluid supply pipe 401, the eleventh pipe 402, the twelfth pipe 403, and the seventh pipe 404. Therefore, the fourth hydraulic line 4 includes the component of the second hydraulic supply line 1-2 or mean the seventh pipe 404 connected to the twelfth pipe 403.

Furthermore, the end portion of the second operating fluid supply pipe 401 is connected to the master cylinder 100, and the end portion of the seventh pipe 404 is connected to the fourth caliper 841. The fourth valve 131 is disposed in the fourth hydraulic line 4, and the fourth valve 131 is disposed between the twelfth pipe 403 and the seventh pipe 404. The third switch valve 233 is disposed in the second hydraulic supply line 1-2. Therefore, an operation of the third switch valve 233 will be described below as an operating fluid control operation through the second hydraulic supply line 1-2. However, the third switch valve 233 can be disposed in the first hydraulic supply line 1-1 or the second hydraulic supply line 1-2. This is because the third switch valve 233 disposed in the first hydraulic supply line 1-1 is changed from the second hydraulic supply line 1-2 only to the first hydraulic supply line 1-1 and the operating fluid control operation thereof is performed in the same manner.

The third switch valve 233 is disposed on at least any one of between one end portion of the fifth hydraulic line 101 and a branch point of the second hydraulic line 2 on the first hydraulic supply line 1-1 or between the other end portion of the fifth hydraulic line 101 and a branch point of the third hydraulic line 3 on the second hydraulic supply line 1-2.

The third switch valve 233 may be disposed between the first hydraulic line 1 and the second hydraulic line 2 or between the third hydraulic line 3 and the fourth hydraulic line 4. That is, the third switch valve 233 is disposed between the third valve 232 and the fourth valve 131 or between the first valve 132 and the second valve 231. The third switch valve 233 may be disposed in the twelfth pipe 403, and more specifically, the third switch valve 233 is disposed between the third valve 232 and the end portion of the fifth hydraulic line 101.

Meanwhile, the fourth switch valve 113 may be any one of the second valve 231 or the third valve 232.

As such, the first switch valve 111 may be disposed on the fifth hydraulic line 101, and the second switch valve 112 may be disposed at any one side of the sixth hydraulic line 102.

Furthermore, the first and second hydraulic supply lines 1-1 and 1-2 and the hydraulic line 1-3 is divided into a pipe, and the pipe is classified into the sixth pipe 305, the eighth pipe 405, the ninth pipe 302, the tenth pipe 303, the eleventh pipe 402, and the twelfth pipe 403 together with the first pipe 306, the second pipe 406, the third pipe 501, the fourth pipe 601, the fifth pipe 304, the seventh pipe 404, the thirteenth pipe 502, and the fourteenth pipe 602. The sixth pipe 305 is the component of the second hydraulic line 2, the eighth pipe 405 is the component of the third hydraulic line 3, the ninth pipe 302 and the tenth pipe 303 are connected to each other and are the component of the first hydraulic supply line 1-1 or the first hydraulic line 1, and the eleventh pipe 402 and the twelfth pipe 403 are connected to each other and are the component of the second hydraulic supply line 1-2 or the fourth hydraulic line 4.

Figure 5:
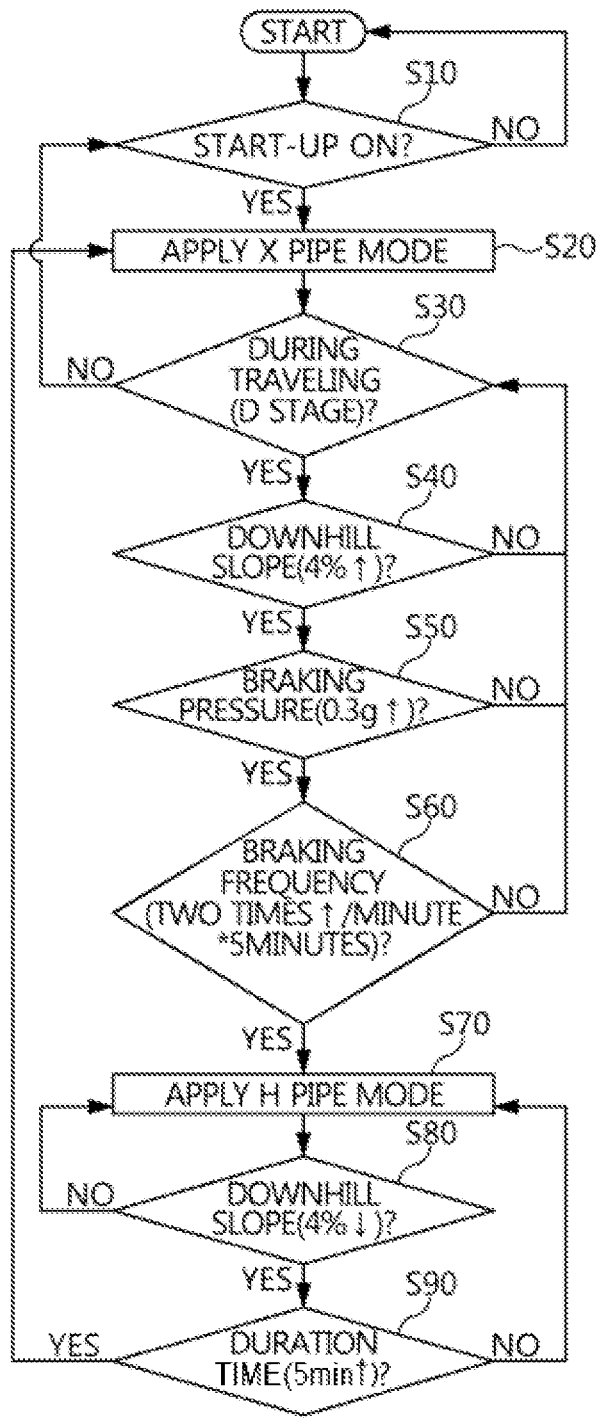
FIG. 5 is a flowchart of a method for controlling the brake hydraulic line according to an exemplary embodiment of the present invention.
Figure 5:
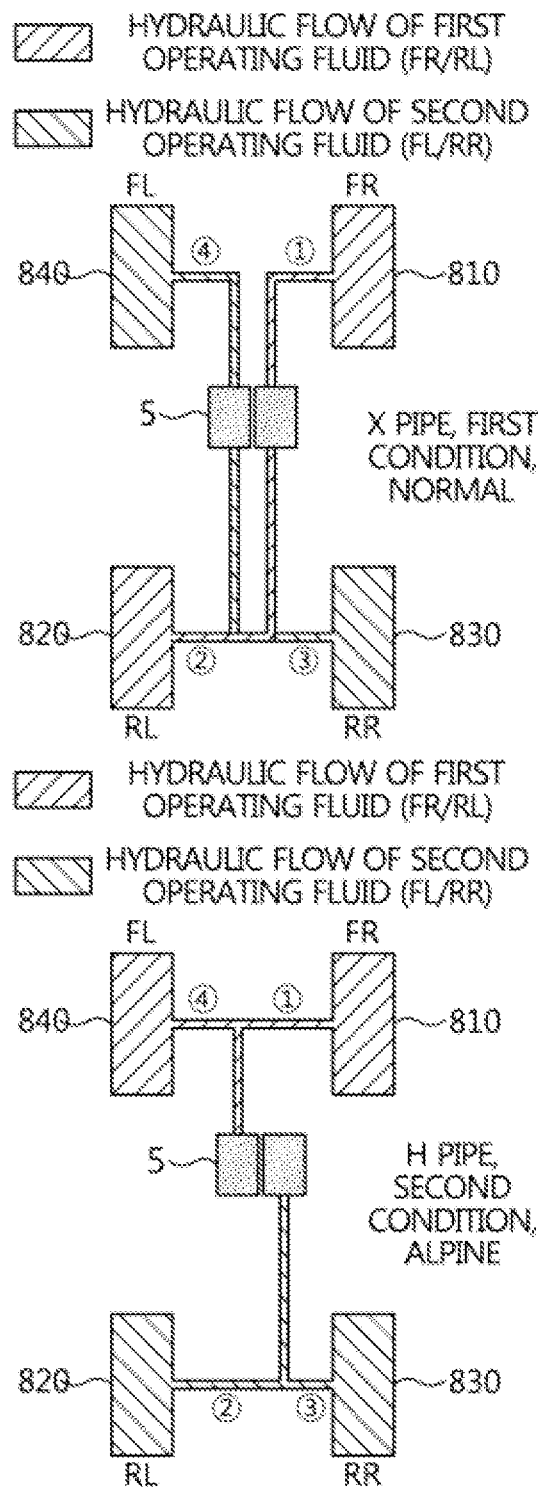

Meanwhile, a brake control unit 5 determines a first condition in which the vehicle is in the normal traveling state and a second condition in which the vehicle is in the alpine traveling state to control the first switch valve 111, the second switch valve 112, the third switch valve 233, and the fourth switch valve 113. For example, the brake control unit 5 controls a valve, a motor, a pump, an accumulator, a pressure sensor, etc. To control the hydraulic pressure circulating the brake hydraulic circuit 1 connected to the master cylinder, and for the present purpose, can apply an Anti Brake System Hydraulic Electronic Control Unit (ABS HECU). Therefore, the brake control unit 5 stores control logic for performing when the second condition (alpine condition) is satisfied together with the first condition (normal traveling condition) in FIG. 5 to memory by the programming, implementing the first and second conditions in addition to the basic operation of the ABS HECU by a control operation.

Furthermore, the brake control unit 5 receives the vehicle traveling information of an engine Electronic Control Unit (ECU), the shifting stage information of a Transmission Control Unit (TCU), and the road gradient value by a slope sensor as input values, respectively, and performs a valve control and a hydraulic flow control according to the respective conditions reflecting the above.

That is, in the brake control unit 5 of an exemplary embodiment of the present invention, a pair of the first switch valve 111 and the second switch valve 112 and a pair of the third switch valve 233 and the fourth switch valve 113 can operate the opening or the closing in the same manner as each other, and a pair of the first switch valve 111 and the third switch valve 233 and a pair of the second switch valve 112 and the fourth switch valve 113 can operate the opening or the closing in the opposite direction to each other.

For example, when the first switch valve 111 and the second switch valve 112 are closed under the control of the brake control unit 5, respectively, the third switch valve 233 and the fourth switch valve 113 are all opened by a control of the brake control unit 5.

Conversely, when the first switch valve 111 and the second switch valve 112 are opened under the control of the brake control unit 5, respectively, the third switch valve 233 and the fourth switch valve 113 are all closed by a control of the brake control unit 5.

Herein, the normal traveling state refers to a traveling state in which a state where the gradient of the traveling road is equal to or greater than −4 degrees and smaller than +4 degrees is kept. In the instant case, '+' indicates the uphill slope and '−' indicates the downhill slope, respectively.

More specifically, assuming that the slope of the flat is 0 degrees, the gradient of the normal traveling has the slope between +4 degrees and −4 degrees based on the flat. That is, the slope in the normal traveling indicates the slope between the uphill slope of +4 degrees and the downhill slope of −4 degrees.

Meanwhile, in the alpine traveling, the gradient of the traveling road has a slope that deviates from the gradient of the normal traveling, and indicates the traveling state when the downhill slope is equal to or greater than −4 degrees. The 'first condition,' which will be described below, indicates a traveling condition in which the vehicle is in the normal traveling state, and at the present time, the gradient of the traveling road is smaller than −4 degrees.

Meanwhile, the 'second condition' below indicates a traveling condition in which the vehicle is in the alpine traveling state. The second condition includes at least any one of the gradient of the traveling road of the vehicle, the braking pressure, and the braking frequency information. At the present time, the gradient of the traveling road is preferably −4 degrees or more, the braking pressure is equal to or greater than 0.3 g, and the braking frequency is 2 times or more per minute and the slope of −4 degrees continues for at least 5 minutes.

For example, when the second condition is satisfied, the first switch valve 111 and the second switch valve 112 are opened by a control of the brake control unit 5 and the third switch valve 233 and the fourth switch valve 113 are closed by a control of the brake control unit 5 so that the first operating fluid may be provided to the first hydraulic line 1 and the fourth hydraulic line 4 and the second operating fluid may be separately provided to the second hydraulic line 2 and the third hydraulic line 3, respectively.

The brake hydraulic circuit 1 controlled when the second condition is satisfied is also referred to as an H pipe mode. In the H pipe mode, the first operating fluid is provided to the front wheel side brake system, and the second operating fluid is separately provided to the rear wheel side brake system. That is, the respective operating fluids may be separately provided to the front wheel side and rear wheel side brake systems without being mixed.

Meanwhile, when the first condition is satisfied, the first switch valve 111 and the second switch valve 112 are closed by a control of the brake control unit 5 and the third switch valve 233 and the fourth switch valve 113 are opened by a control of the brake control unit 5 so that the first operating fluid may be provided to the first hydraulic line 1 and the second hydraulic line 2 and the second operating fluid may be separately provided to the third hydraulic line 3 and the fourth hydraulic line 4, respectively.

For example, the brake hydraulic circuit 1 controlled when the first condition is satisfied is also referred to as an X pipe mode.

Meanwhile, as another exemplary embodiment of the present invention, the third switch valve 233 may be disposed in the ninth pipe 302, and more specifically the third switch valve 233 is disposed between the end portions of the second valve 231 and the fifth hydraulic line 101. In the instant case, the fifth hydraulic line 101 connects the first hydraulic line with the fourth hydraulic line.

The fifth hydraulic line 101 has one end portion connected between the first valve 132 and the second valve 231, and has the other end portion connected between the third switch valve 233 and the fourth valve 131. The fifth valve 512 may be disposed on the fifth hydraulic line 101.

Furthermore, the sixth hydraulic line 102 has the second switch valve 112 and connects the second hydraulic line and the third hydraulic line. More specifically, the sixth hydraulic line 102 has one end portion connected between the second valve 231 and the left rear wheel caliper 821 at the second hydraulic line, and has the other end portion connected between the third valve 232 and the right rear wheel caliper 831 at the third hydraulic line. The sixth valve 511 may be disposed on the sixth hydraulic line 102.

Meanwhile, a first pump 711 is disposed in the first pipe 306 and receives a driving force from a motor 710.

The first pipe 306 can have one end portion branched between a branch point of the second hydraulic line and the master cylinder 100 on the first hydraulic supply line and has the other end portion connected to a first accumulator 721. The first accumulator 721 is connected to a branch point of the first pump 711 and the third pipe 501. The third pipe 501 is extended from the first accumulator 721. The thirteenth pipe 502 is extended to the third pipe 501. The fifth valve 512 is disposed at the end portion of the thirteenth pipe 502 to be connected in series with the first valve 132.

That is, the fifth valve 512 is branched from the third pipe 501 to be connected to the first valve 132.

The fifth pipe 304 has one end portion connected between the first valve 132 and the fifth valve 512, and the other end portion connected to the first caliper 811. The sixth valve 511 has one end portion connected in series with the second valve 231, and the other end portion connected to a branch point of the third pipe 501 and the thirteenth pipe 502.

That is, the sixth valve 511 is branched from the third pipe 501 to be connected to the second valve 231.

Furthermore, the second pump 712 is disposed in the second pipe 406 and receives a driving force from the motor 710.

The second pipe 406 can have one end portion branched between a branch point of the third hydraulic line and the master cylinder on the second hydraulic supply line and has the other end portion connected to a second accumulator 722.

The fourth pipe 601 is extended from the second accumulator 722. The second accumulator 722 is connected to a branch point of the second pump 712 and the fourth pipe 601. The fourteenth pipe 602 is extended to the fourth pipe 601. The eighth valve 612 is disposed at the end portion of the fourteenth pipe 602 to be connected in series with the fourth valve 131.

That is, the eighth valve 612 is branched from the fourth pipe 601 to be connected to the fourth valve 131.

The seventh pipe 404 has one end portion connected between the fourth valve 131 and the eighth valve 612, and the other end portion connected to the fourth caliper 841. The seventh valve 611 has one end portion connected in series with the third valve 232, and the other end portion connected to a branch point of the fourth pipe 601 and the fourteenth pipe 602.

That is, the seventh valve 611 is branched from the fourth pipe 601 to be connected to the third valve 232.

FIG. 1 shows a brake hydraulic line in the normal condition state.

In the normal condition, the first switch valve 111 and the second switch valve 112 are closed by a control of the brake control unit 5, respectively, and the first valve 132, the second valve 231, the third valve 232, and the fourth valve 131 are all opened by a control of the brake control unit 5.

More specifically, the first operating fluid can be provided to the first hydraulic line 1 and the second hydraulic line 2, and the second operating fluid can be provided to the third hydraulic line 3 and the fourth hydraulic line 4.

Therefore, the first wheel brake 810 can be braked while a brake pad disposed in the first caliper 811 rubs against the first disc 812 due to the pressure of the first operating fluid.

For example, the second wheel brake 820 can be braked while the brake pad disposed in the second caliper 821 rubs against the second disc 822 due to the pressure of the first operating fluid. The third wheel brake 830 can be braked while the brake pad disposed in the third caliper 831 rubs against the third disc 832 due to the pressure of the second operating fluid. The fourth wheel brake 840 may be braked while the brake pad disposed in the fourth caliper 841 rubs against the fourth disc 842 due to the pressure of the second operating fluid.

Figure 2:
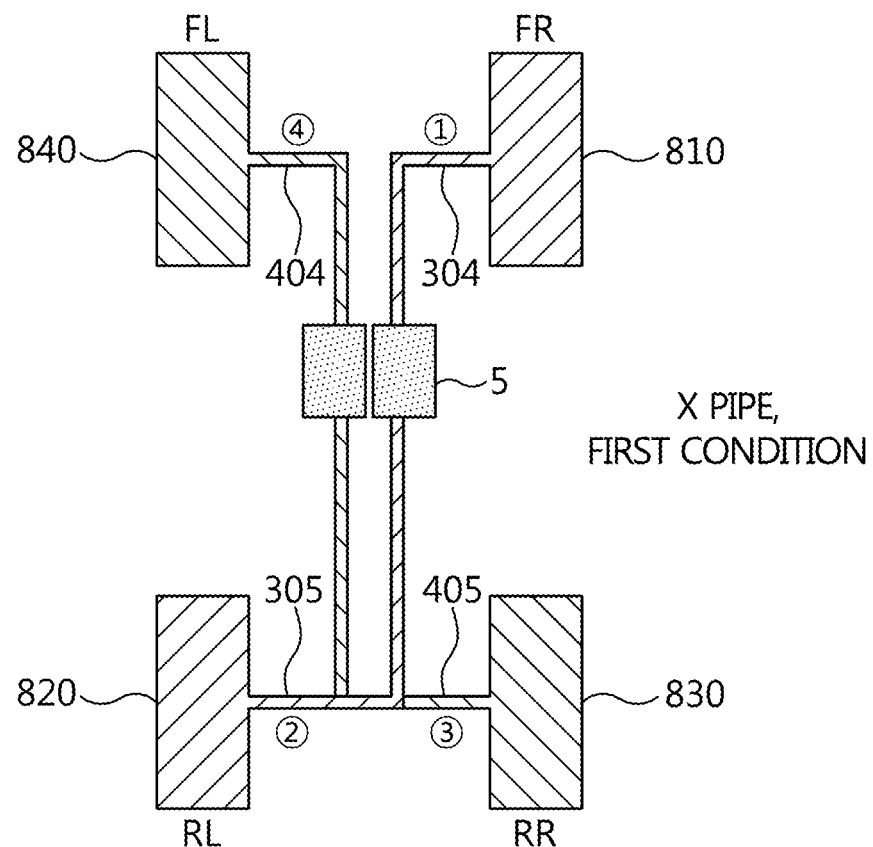
FIG. 2 is a schematic diagram of an X-shaped braking in the normal condition according to an exemplary embodiment of the present invention.

That is, as in FIG. 2, in the normal condition, the X pipe mode, in which the first operating fluid applies a braking force to the first wheel brake 810 and the second wheel brake 820, and the second operating fluid applies a braking force to the third wheel brake 830 and the fourth wheel brake 840, respectively, is performed.

Figure 3:
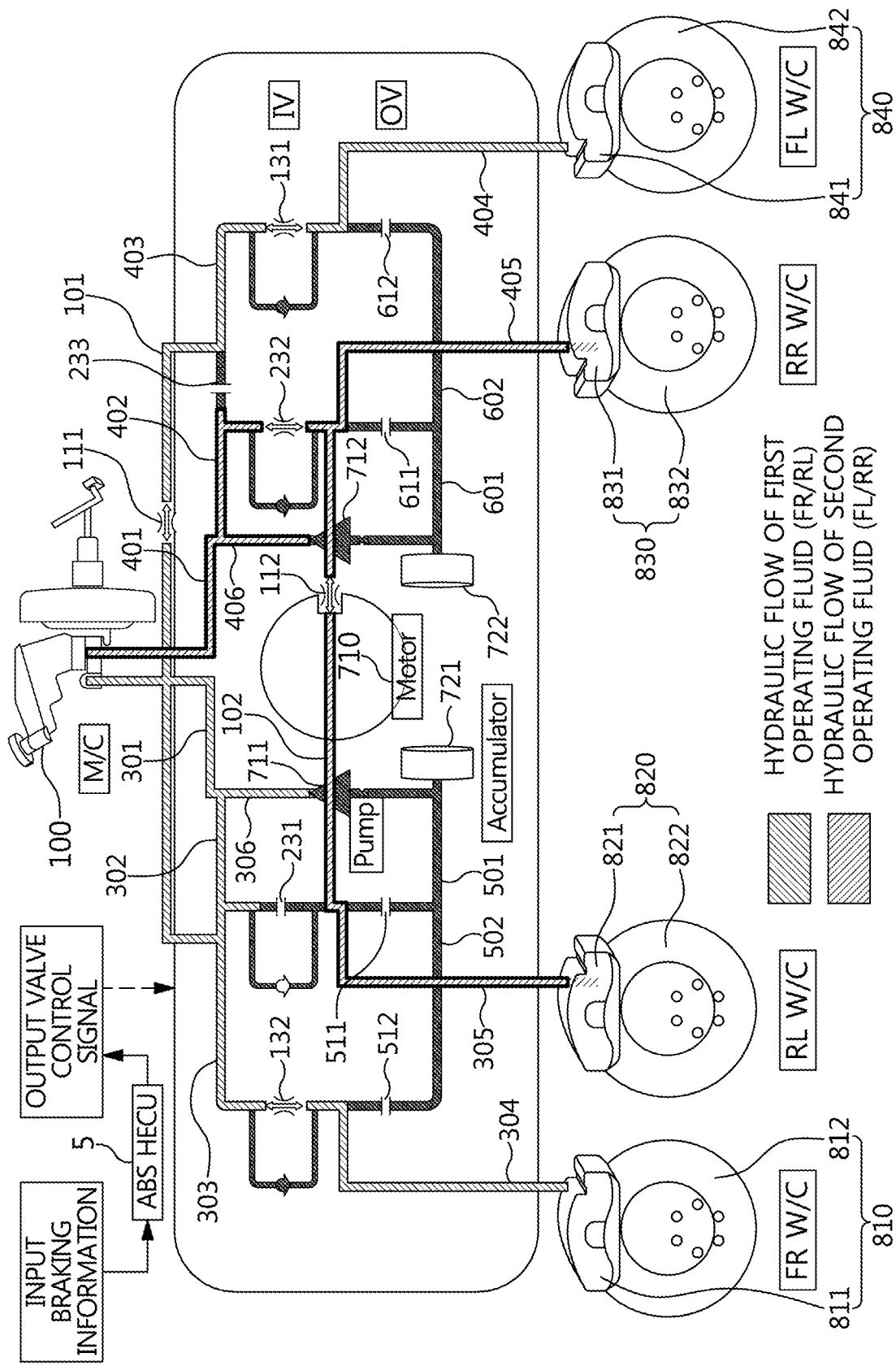
FIG. 3 is a diagram showing a brake hydraulic line in an alpine condition according to an exemplary embodiment of the present invention.

Meanwhile, the braking when the vehicle travels in the alpine traveling condition will be described with reference to FIG. 3 as follows.

The braking in the alpine traveling condition is determined by at least any one of the traveling road slope, the braking pressure, and the braking frequency information. At the instant time, the gradient of the traveling road is equal to or greater than −4 degrees, the braking pressure is equal to or greater than 0.3 g, the braking frequency is 2 times or more per minute, and the slope of −4 degree continues for at least 5 minutes. At the instant time, 0.3 g corresponds to 0.3 times gravity, and as in FIG. 3, the third switch valve 233 and the second valve 231 are closed by a control of the brake control unit 5, and the first valve 132, the third valve 232, and the fourth valve 131 are opened by a control of the brake control unit 5.

That is, the individual operating fluid may be separately provided to the first hydraulic line 1 and the fourth hydraulic line 4, and the second hydraulic line 2 and the third hydraulic line 3 in the alpine traveling condition, respectively.

In the alpine condition, the second valve 231 and the third switch valve 233 are closed by a control of the brake control unit 5, respectively, and the first switch valve 111, the second switch valve 112, the fourth valve 131, the first valve 132, and the third valve 232 are all opened by a control of the brake control unit 5. More specifically, the first operating fluid can be provided to the first hydraulic line and the fourth hydraulic line, and the second operating fluid can be provided to the second hydraulic line and the third hydraulic line.

Therefore, the first wheel brake 810 can be braked while the brake pad disposed in the first caliper 811 rubs against the first disc 812 due to the pressure of the first operating fluid.

For example, the second wheel brake 820 can be braked while the brake pad disposed in the second caliper 821 rubs against the second disc 822 due to the pressure of the second operating fluid. The third wheel brake 830 can be braked while the brake pad disposed in the third caliper 831 rubs against the third disc 832 due to the pressure of the second operating fluid. The fourth wheel brake 840 can be braked while the brake pad disposed in the fourth caliper 841 rubs against the fourth disc 842 due to the pressure of the first operating fluid.

Figure 4:
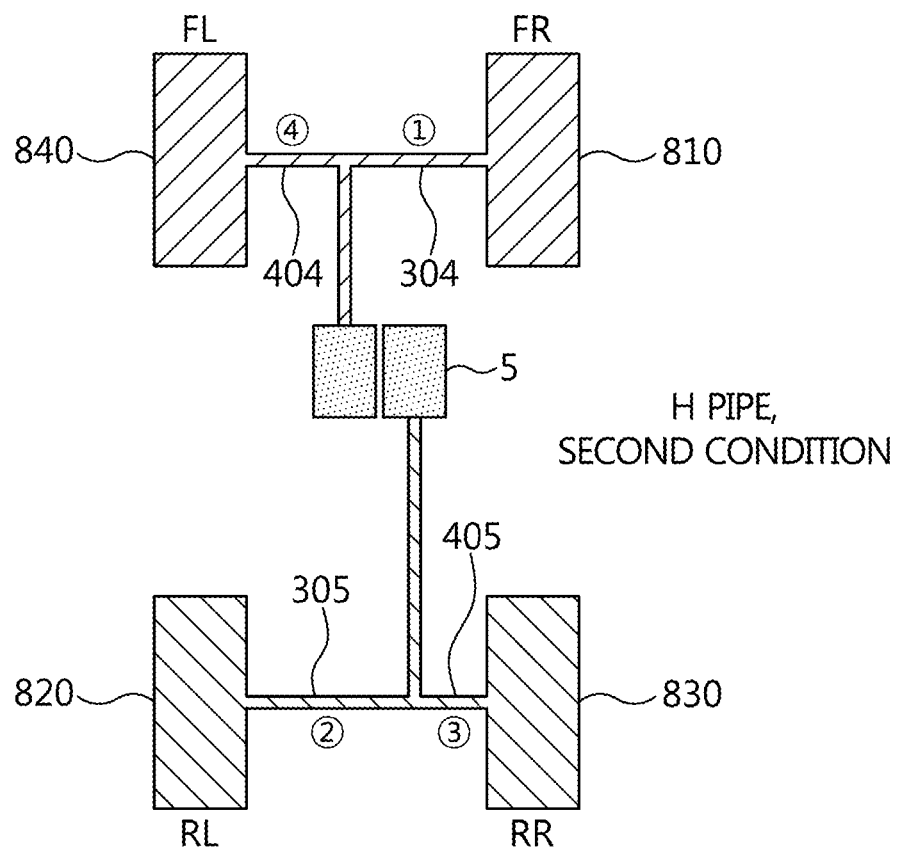
FIG. 4 is a schematic diagram of an H-shaped braking in the alpine condition according to an exemplary embodiment of the present invention.

That is, as in FIG. 4, in the alpine condition, the H pipe mode, in which the first operating fluid applies a braking force to the first wheel brake 810 and the fourth wheel brake 840, and the second operating fluid applies a braking force to the second wheel brake 820 and the third wheel brake 830, respectively, is performed.

That is, in the alpine condition, the arrangement of the X-shaped hydraulic line in the normal condition is changed to the arrangement of the H-shaped hydraulic line so that the first operating fluid applies a braking force to the front wheels and the second operating fluid separately applies a braking force to the rear wheels, respectively. As a result, it is possible to change the brake hydraulic line even without increasing the size of the brake, keeping the braking force without adversely affecting other operating fluids even if the Vapor Lock occurs in any one operating fluid.

Next, a method for controlling a brake by determining the second condition (alpine condition) according to an exemplary embodiment of the present invention will be described with reference to the accompanying drawings.

A method for controlling the brake hydraulic line according to an exemplary embodiment of the present invention includes determining traveling, determining a slope, determining braking pressure, determining braking frequency, and changing a hydraulic supply line in the above-described brake system. In the instant case, it is presupposed that the brake control unit 5 performs a valve control and a hydraulic flow control according to the respective conditions from the input data reflecting the vehicle traveling information of the engine ECU, the shifting stage information of the TCU, and the road gradient value by the slope sensor. Therefore, the determining the traveling, the determining the slope, the determining the braking pressure, the determining the braking frequency, and the changing the hydraulic supply line are accompanied by the valve control and the hydraulic flow control by the brake control unit 5. All the control operations of the brake control unit 5 may be performed by the ABS HECU, but will be described by the brake control unit 5.

The brake-provided hydraulic pressure is in the X-shaped arrangement state in a state where the vehicle is in the initial start-up state S10. This is called an X pipe mode S20. That is, the brake control unit 5 forms the brake system in the X pipe mode according to the normal condition that supplies the first operating fluid to the first wheel brake 810 and the second wheel brake 820 while supplying the second operating fluid to the third wheel brake 830 and the fourth wheel brake 840.

Thereafter, the operation of the brake control unit 5 is as follows.

The determining the traveling S30 determines whether the transmission is placed in a drive position and the vehicle is traveling.

The determining the slope S40 determines whether the gradient of the traveling road during traveling is a ramp satisfying a predetermined slope value. The predetermined slope value is equal to or greater than −4 degrees in the determining the slope.

The determining the braking pressure S50 determines whether the braking pressure of the vehicle traveling on the ramp satisfies a predetermined braking pressure value. The predetermined braking pressure value is equal to or greater than 0.3 g in the determining the braking pressure. At the instant time, 0.3 g corresponds to 0.3 times gravity.

The determining the braking frequency S60 determines whether the braking frequency of the vehicle traveling on the ramp is equal to a predetermined braking frequency value.

The predetermined braking frequency value is a state where the slope of −4 degrees continues at two times or more per minute for at least 5 minutes in the determining the braking frequency.

In the changing the hydraulic supply line S70, the individual operating fluid is separately provided to the first hydraulic line and the fourth hydraulic line, and the second hydraulic line and the third hydraulic line, respectively when the predetermined slope value, the predetermined braking pressure value, and the predetermined braking frequency value are all satisfied (i.e., in the case of the alpine condition).

That is, the brake control unit 5 forms the brake system in the H pipe mode according to the alpine condition that supplies the first operating fluid to the first wheel brake 810 and the fourth wheel brake 840 while supplying the second operating fluid to the second wheel brake 820 and the third wheel brake 830.

Thereinafter, the operation of the brake control unit 5 is as follows.

Next, a method for determining whether the traveling condition of the vehicle is changed from the alpine condition to the normal condition will be described.

That is, the H pipe mode is changed back to the X pipe mode when the condition is satisfied by setting the first gradient to the second gradient, and the first gradient duration time to the second gradient duration time after the H pipe mode. That is, the traveling condition of the vehicle is changed from the second condition to the first condition.

The determining the second gradient S80 is performed in a state where the brake flow path of the vehicle is the H-shaped arrangement. The determining the second gradient S80 determines whether the gradient of the traveling road is a predetermined second gradient. At the instant time, the second gradient is smaller than −4 degrees.

Next, it is determined whether a state where the gradient of the traveling road is smaller than −4 degrees (second gradient) continues for the second time in determining a gradient duration time S90. At the instant time, the second time is equal to or more 5 minutes. When the second gradient and the gradient duration time are all satisfied, the first switch valve 111 and the second switch valve 112 are closed and the third switch valve 233 and the fourth switch valve are opened so that the first operating fluid may be again provided to the first hydraulic line and the second hydraulic line and the second operating fluid may be again provided separately to the third hydraulic line and the fourth hydraulic line, respectively.

That is, it may be seen that the case of satisfying the second gradient and the second time means that it is not the alpine condition, and it may be considered that the traveling condition of the vehicle has been restored to the area of the normal condition. That is, when the second gradient and the second time are satisfied, it is changed from the alpine condition to the normal condition, such that it is possible to return the changed hydraulic supply line back to before being changed (change from the H mode to the X mode).

That is, as the traveling state of the vehicle is changed from the normal condition to the alpine condition, the first operating fluid is provided by being changed to the first hydraulic line and the fourth hydraulic line, and as the traveling state of the vehicle is changed from the alpine condition back to the normal condition, the first operating fluid is provided to the first hydraulic line and the second hydraulic line which is before being changed. That is, the first operating fluid is provided to the fourth hydraulic line in the alpine condition, and when it is determined as the normal condition, the first operating fluid may be provided back to the second hydraulic line.

Furthermore, the second operating fluid is provided to the second hydraulic line in the alpine condition, and when it is determined as the normal condition, the second operating fluid may be provided back to the fourth hydraulic line. That is, the form of providing the brake operating fluid may be again changed (restored) from the H-shaped arrangement (H pipe mode) to the X-shaped arrangement (X pipe mode).

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A brake system having a first hydraulic supply line and a second hydraulic supply line in which an operating fluid is individually provided from a master cylinder of a vehicle, the brake system comprising:
   a first hydraulic line having a first valve and branched from the first hydraulic supply line to connect between a first caliper of a first wheel brake;
   a second hydraulic line having a second valve and branched from the first hydraulic supply line to connect between a second caliper of a second wheel brake disposed on a diagonal line of the first wheel brake;
   a third hydraulic line having a third valve and branched from the second hydraulic supply line to connect between a third caliper of a third wheel brake in a position opposite to the second wheel brake;
   a fourth hydraulic line having a fourth valve and branched from the second hydraulic supply line to connect between a fourth caliper of a fourth wheel brake disposed on a diagonal line of the third wheel brake;
   a third switch valve disposed on one of the first hydraulic supply line and the second hydraulic supply line;
   a fourth switch valve which is one of the second valve or the third valve;
   a fifth hydraulic line having a first switch valve and configured for connecting the first hydraulic line with the fourth hydraulic line;
   a sixth hydraulic line having a second switch valve and configured for connecting the second hydraulic line with the third hydraulic line; and
   a brake control unit configured of determining when the vehicle satisfies a first condition which is in a normal traveling state of the vehicle, or when the vehicle satisfies a second condition which is in an alpine traveling state of the vehicle.

2. The brake system of claim 1,
wherein the brake control unit is configured to control the first switch valve, the second switch valve, the third switch valve, and the fourth switch valve so that a pair of the first switch valve and the second switch valve and a pair of the third switch valve and the fourth switch valve operate an opening or a closing thereof in a same manner as each other, and a pair of the first switch valve and the third switch valve and a pair of the second switch valve and the fourth switch valve operate an opening or a closing thereof in an opposite manner to each other according to determination of satisfying the first condition which is in the normal traveling state and of satisfying the second condition which is in the alpine traveling state.

3. The brake system of claim 2,
wherein upon determining that the vehicle satisfies the second condition, the brake control unit is configured to control to open the first switch valve and the second switch valve, and close the third switch valve and the fourth switch valve so that a first operating fluid of the operating fluid is provided to the first hydraulic line and the fourth hydraulic line, and a second operating fluid of the operating fluid is separately provided to the second hydraulic line and the third hydraulic line, respectively.

4. The brake system of claim 2,
wherein upon determining that the vehicle satisfies the first condition, the brake control unit is configured to control to close the first switch valve and the second switch valve, and open the third switch valve and the fourth switch valve so that a first operating fluid of the operating fluid is provided to the first hydraulic line and the second hydraulic line, and a second operating fluid of the operating fluid is separately provided to the third hydraulic line and the fourth hydraulic line, respectively.

5. The brake system of claim 1,
wherein the third switch valve is disposed on at least one of between a first end portion of the fifth hydraulic line and a branch point of the second hydraulic line on the first hydraulic supply line or between a second end portion of the fifth hydraulic line and a branch point of the third hydraulic line on the second hydraulic supply line.

6. The brake system of claim 1,
wherein the second condition is determined by at least one of traveling road slope, braking pressure, and braking frequency information.

7. The brake system of claim 6,
wherein the traveling road slope is equal to or greater than −4 degrees, the braking pressure is equal to or greater than 0.3 g, and the braking frequency is equal to or greater than two times per minute for at least 5 minutes.

8. The brake system of claim 1,
wherein the first condition is determined by at least one of traveling road slope of the vehicle and traveling time information of the vehicle traveling on the traveling road slope thereof.

9. The brake system of claim 8,
wherein the traveling road slope is a slope continuing in a state smaller than −4 degrees for at least 5 minutes.

10. The brake system of claim 1, further including:
a first pipe having a first end portion branched between a branch point of the second hydraulic line and the master cylinder and having a second end portion connected to a first accumulator mounted on the first hydraulic supply line;
a first pump disposed in the first pipe;
a second pipe having a first end portion branched between a branch point of the third hydraulic line and the master cylinder and having a second end portion connected to a second accumulator mounted on the second hydraulic supply line; and
a second pump disposed in the second pipe.

11. The brake system of claim 10, further including:
a third pipe extending from the first accumulator;
a fifth valve branched from the third pipe to be connected to the first valve;
a sixth valve branched from the third pipe to be connected to the second valve;
a fourth pipe extending from the second accumulator;
a seventh valve branched from the fourth pipe to be connected to the third valve; and
an eighth valve branched from the fourth pipe to be connected to the fourth valve.

12. The brake system of claim 11,
wherein the first hydraulic line is branched between the first valve and the fifth valve.

13. The brake system of claim 11,
wherein the second hydraulic line is branched between the second valve and the sixth valve.

14. The brake system of claim 11,
wherein the third hydraulic line is branched between the third valve and the seventh valve.

15. The brake system of claim 11,
wherein the fourth hydraulic line is branched between the fourth valve and the eighth valve.

16. The brake system of claim 11,
wherein the sixth hydraulic line has a first end portion connected between the second valve and the sixth valve, and has a second end portion connected between the third valve and the seventh valve.

17. A method of controlling a brake, the method comprising:
determining, by a brake control unit, traveling of a vehicle, in which supplies a first operating fluid to a first wheel brake and a second wheel brake while supplying a second operating fluid to a third wheel brake and a fourth wheel brake by setting a brake system to an X pipe mode, in a response that the traveling of the vehicle is determined by the brake control unit;
determining, by the brake control unit, a first slope value that is configured to determine when a traveling road slope of the vehicle is a ramp satisfying a predetermined slope value;
determining, by the brake control unit, a braking pressure that is configured to determine when the braking pressure of the vehicle satisfies a predetermined braking pressure value;
determining, by the brake control unit, a braking frequency that is configured to determine when the braking frequency of the vehicle is equal to a predetermined braking frequency value; and
changing, by the brake control unit, a hydraulic supply line that supplies the first operating fluid to the first wheel brake and the fourth wheel brake while supplying the second operating fluid to the second wheel brake and the third wheel brake by setting the brake system to an H pipe mode, upon determining that the predetermined slope value, the predetermined braking pressure value, and the predetermined braking frequency value are all satisfied.

18. The method of controlling the brake of claim 17,
wherein a change from the X pipe mode to the H pipe mode is a state in which the first slope value is equal to or greater than −4 degrees, the braking pressure value is equal to or greater than 0.3 g, and the braking frequency value continues at two times or more per minute for at least 5 minutes.

19. The method of controlling the brake of claim 17, further including:
determining, by the brake control unit, a second slope value that is configured to determine when the traveling road slope is equal to a predetermined second gradient; and
determining, by the brake control unit, a second gradient duration time that is configured to determine when the second gradient continues for at least 5 minutes,
wherein the change to the X pipe mode after the H pipe mode is determined.

20. The method of controlling the brake of claim 19,
wherein upon determining that the second gradient is smaller than −4 degrees, and the second gradient duration time is equal to or more 5 minutes, the H pipe mode is changed to the X pipe mode.

* * * * *